United States Patent [19]

Clark

[11] Patent Number: 5,949,437
[45] Date of Patent: Sep. 7, 1999

[54] DUAL VIDEO OUTPUT BOARD WITH A SHARED MEMORY INTERFACE

[75] Inventor: Richard Clark, Seattle, Wash.

[73] Assignee: Appian Graphics Corp., Redmond, Wash.

[21] Appl. No.: 08/803,841

[22] Filed: Feb. 19, 1997

[51] Int. Cl.[6] ................................................. G06F 15/16
[52] U.S. Cl. .................................. 345/502; 345/1; 345/3; 345/521; 345/501
[58] Field of Search .................................... 345/1–3, 501, 345/502, 507–509, 512, 521

[56] References Cited

U.S. PATENT DOCUMENTS

| | | | |
|---|---|---|---|
| 4,965,559 | 10/1990 | Dye ............................................. | 345/1 |
| 5,488,385 | 1/1996 | Singhal et al. .............................. | 345/1 |
| 5,555,460 | 9/1996 | Ericsson ...................................... | 345/3 |
| 5,694,141 | 12/1997 | Chee ........................................... | 345/1 |

OTHER PUBLICATIONS

PC Graphics Struggle to Incorporate by Richard A. Quinnell from *EDN Design Feature* dated Mar. 14, 1996 at pp. 61, 62, 64, 66, 70, 72 and 73.

Prudential Analyst Seek Better Times Ahead for Companies with Proprietary Products from *Electronic Engineering Times* dated Mar. 25, 1996 at p. 32.

*Aurora 64V + Mobil Acceleration*, Jul., 1996 at Introduction pp. 1–1 thru 1–2; CRT/TV Interface pp. 10–1 thru 10–5; and Flat Panel Interface at pp. 11–1 thru 11–14.

Appian's Home Page for Multiple Monitors dated Oct. 31, 1996.

*Primary Examiner*—Kee M. Tung
*Attorney, Agent, or Firm*—Holme Roberts & Owen LLP

[57] ABSTRACT

The novel graphics system (10) includes multiple displays (20 and 22) supported by a single frame buffer (18) thereby reducing hardware requirements and costs. The system (10) further includes an operating system driver interface (12), a software driver interface (14) and graphics circuitry (16). In one embodiment, the graphics circuitry (16) includes a graphics chip (34) for providing an analog output (36) and a digital output (38). The digital output (38) is processed by a data reformatter (40) and a digital-to-analog converter (42) to provide an analog signal (44). The invention thus takes advantage of existing mixed output chips to implement a multiple analog CRT monitor system in a cost effective manner.

3 Claims, 6 Drawing Sheets

DUAL VIDEO OUTPUT BOARD WITH A SHARED MEMORY INTERFACE

FIELD OF THE INVENTION

The present invention relates generally to multiple display computer systems and, in particular, to a novel architecture and process for implementing such a system whereby multiple digital or multiple analog monitors are driven by a single graphics chip with a single memory interface.

BACKGROUND OF THE INVENTION

Multiple display computer systems have been proposed for many applications.

One type of such applications involves enlarging the graphical desktop of a graphical user interface (GUI) operating system by spreading the graphical desktop over multiple displays. Such an enlarged desktop is particularly advantageous for certain graphically intensive environments such as CAD, video editing and financial programs. For example, when editing video chips, one display can be operated in a high resolution mode as the system display to provide user interface support, while the other display displays the work in progress or edited chip. In the financial environment, multiple displays can be used for displaying large spreadsheets or multiple applications.

The architecture employed to implement such multi-display systems has generally mirrored the architecture employed in conventional single display systems only in multiple form. That is, each display in such systems has typically included its own graphics chip with an associated memory device or frame buffer. Moreover, in this architecture, each graphics chip receives operating system driver calls only for its own display. In this regard, a software driver interface operates between the operating system and the graphics chips to, among other things, separate driver calls from the operating system (which normally has been designed to expect only a single display) into separate calls for the multiple chips. Such systems make effective use of multiple monitors but require significant hardware support which increases costs.

Another type of multiple monitor system has been developed for specific laptop applications such as presentation support. This type of system supports one digital display output and one analog display output. In the presentation environment, the digital output is used to drive the LCD display of the speaker's laptop. The analog output can be used to drive a CRT monitor viewed by the audience. The architecture for this type of system employs a single graphics chip with a single frame buffer to provide the digital and analog outputs. Such systems make efficient use of hardware but are limited to mixed digital/analog display environments.

SUMMARY OF THE INVENTION

The present invention is directed to a novel architecture and process for increased hardware efficiency in a variety of multi-display environments. The invention allows for driving two or more displays of the same type, digital or analog, using a single memory interface and, preferably, a single graphics chip. In addition, the invention accommodates enlarged desktop applications under a GUI operating system using a single memory interface for more than one of the displays. Additional objectives and advantages of the present invention will be apparent upon consideration of the description below.

According to one aspect of the present invention, a novel single memory interface graphics device architecture is implemented in a circuit board environment for driving multiple displays of the same type. As used herein, the term "circuit board" encompasses any board, card or the like for interfacing with a bus of a host computer via a slot or similar port. It will be appreciated that the various components described below may be located on separate circuit boards, if desired. The circuit board based graphic device of the present invention includes a bus interface such as a PCI edge connector, a memory such as a frame buffer for storing video information, and first and second circuits for respectively driving first and second displays. The first and second displays are of the same type; that is, both of the displays are either digital (e.g., LCD displays) or analog (e.g., CRT monitors). Each of the first and second graphics circuits is electrically connected to the bus interface for communication with the host computer. In addition, each of the graphics circuits is associated with the memory via a memory interface, such as a frame buffer interconnect terminal and/or leads, for accessing video information from the memory and providing an appropriate video output for use by the associated display.

It will be appreciated that multiple monitors of the same type may be desired in a variety of contexts. For example, in certain environments such as the automatic teller machine environment, multiple displays may be required (for example, one facing the customer on the outside and one facing the operator on the inside), yet dimensional constraints or other operational considerations many render CRT monitors impractical. Accordingly, two digital flat panel displays are desired for such applications. Conversely, for many desktop applications such as CAD, video editing and financial applications, multiple CRT monitors may be preferred.

According to another aspect of the present invention, the novel graphics device accommodates operation in an enlarged desktop GUI environment with a shared memory. The memory, which may be a frame buffer sufficient to accommodate two or more displays, stores first video information corresponding to a first portion of the enlarged desktop and second video information corresponding to a second portion of the enlarged desktop. In this regard, the memory preferably has separate address spaces dedicated to each of the desktop portions. The graphics device further includes a first graphics circuit for accessing the first information from the memory and providing a first video output for use by a first display and a second graphics circuit for accessing the second information from the memory and providing a second video output for use by a second display. The first and second displays thus operate as an enlarged desktop for the purposes of the GUI operating system running on the host computer. The host computer may also be provided with a desktop manager application that intercepts and modifies display messages as necessary to allow for transparent operation of multiple displays while avoiding split monitor display of windows or dialogue boxes and providing other multi-monitor functionality.

According to a further aspect of the present invention, a method and apparatus are provided for utilizing a mixed output graphics chip to operate multiple monitors of the same type, thereby achieving certain manufacturing advantages. The graphics device includes a memory and a graphics circuit component, electrically interconnected with the memory, for providing a first digital graphics output and a second analog graphics output. A converter receives either the digital output or the analog output to convert the output to the opposite type. That is, the converter can be a digital to analog converter for converting the digital output to an analog signed, or vice versa. The result is that the mixed output, single memory graphics circuit component can be utilized to provide two outputs of the same type. Because such mixed output components are available on the market, the novel graphics device of the present invention can be implemented in a more cost effective manner.

The present invention thus allows for increased hardware efficiency in a variety of multi-display environments including systems with multiple monitors of the same type. In addition, the invention accommodates enlarged desktop applications while sharing graphics device memory, thereby simplifying manufacturing and reducing costs. The invention also takes advantage of features in existing hardware components developed for other applications to yield a cost effective, reduced hardware multiple display system solution.

BRIEF DESCRIPTION OF THE DRAWINGS

For a more complete understanding of the present invention, and further advantages thereof, reference is now made to the following detailed description, taken in conjunction with the drawings, in which.

DETAILED DESCRIPTION OF THE INVENTION

In the following description, the invention is set forth in the context of various embodiments for implementing a multi-display graphics system employing a single frame buffer memory. It will be appreciated that these embodiments are illustrative and various other implementation options will be apparent to those skilled in the art.

Figure 1:
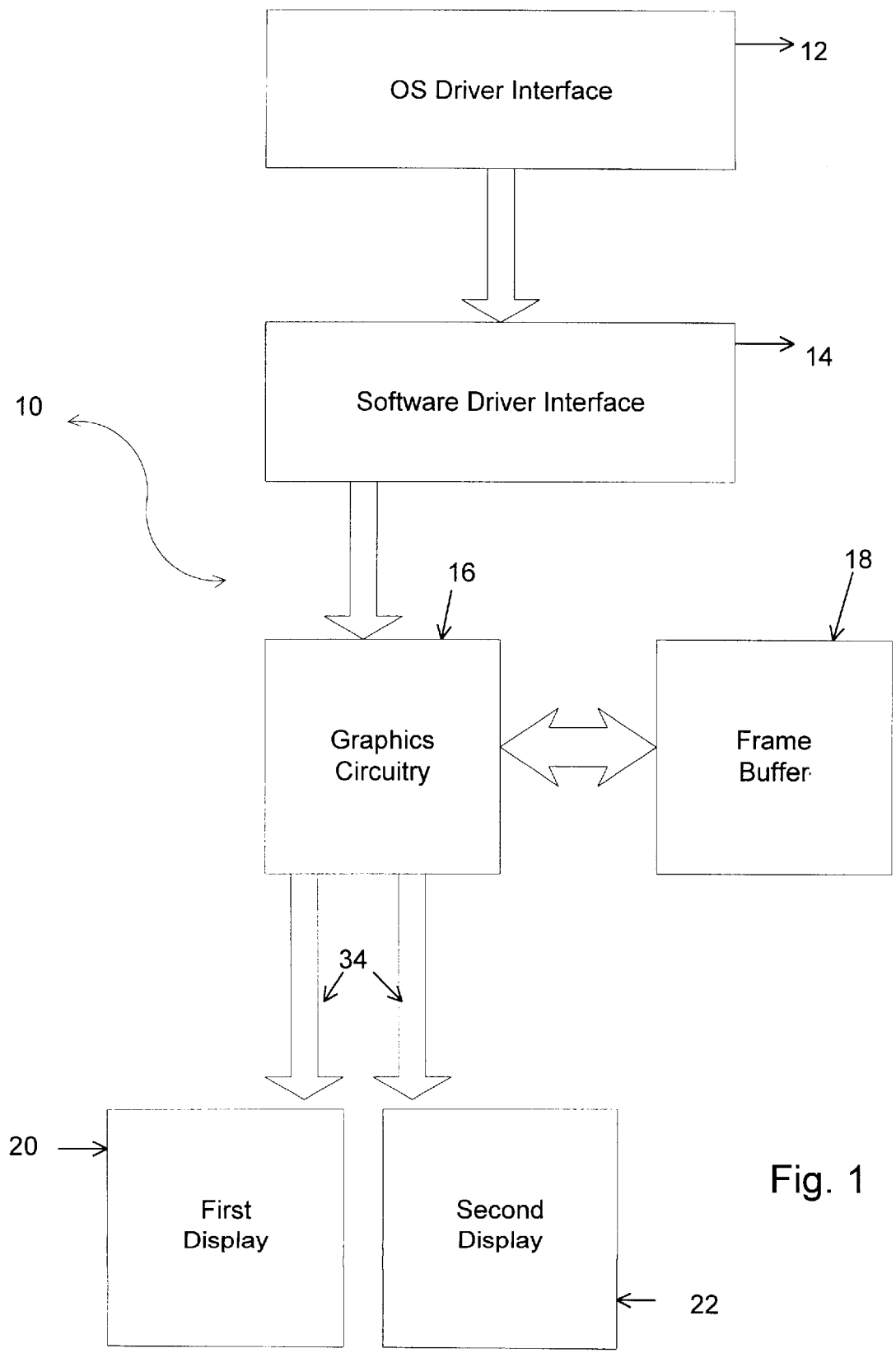
FIG. 1 is a schematic diagram illustrating various functional components of the graphics device of the present invention.

Referring to FIG. 1, a schematic diagram is shown illustrating the overall architecture of a dual monitor graphics system 10 according to the present invention. Although a dual monitor system 10 is shown for purposes of illustration, it will be appreciated that the invention is equally applicable to multi-monitor systems including more than two monitors. Generally, the illustrated dual monitor system 10 includes an operating system (OS) driver interface 12, software driver interface 14, graphics circuitry 16, frame buffer 18 for providing the memory required by circuitry 16, first display 20 and second display 22.

Figure 2:
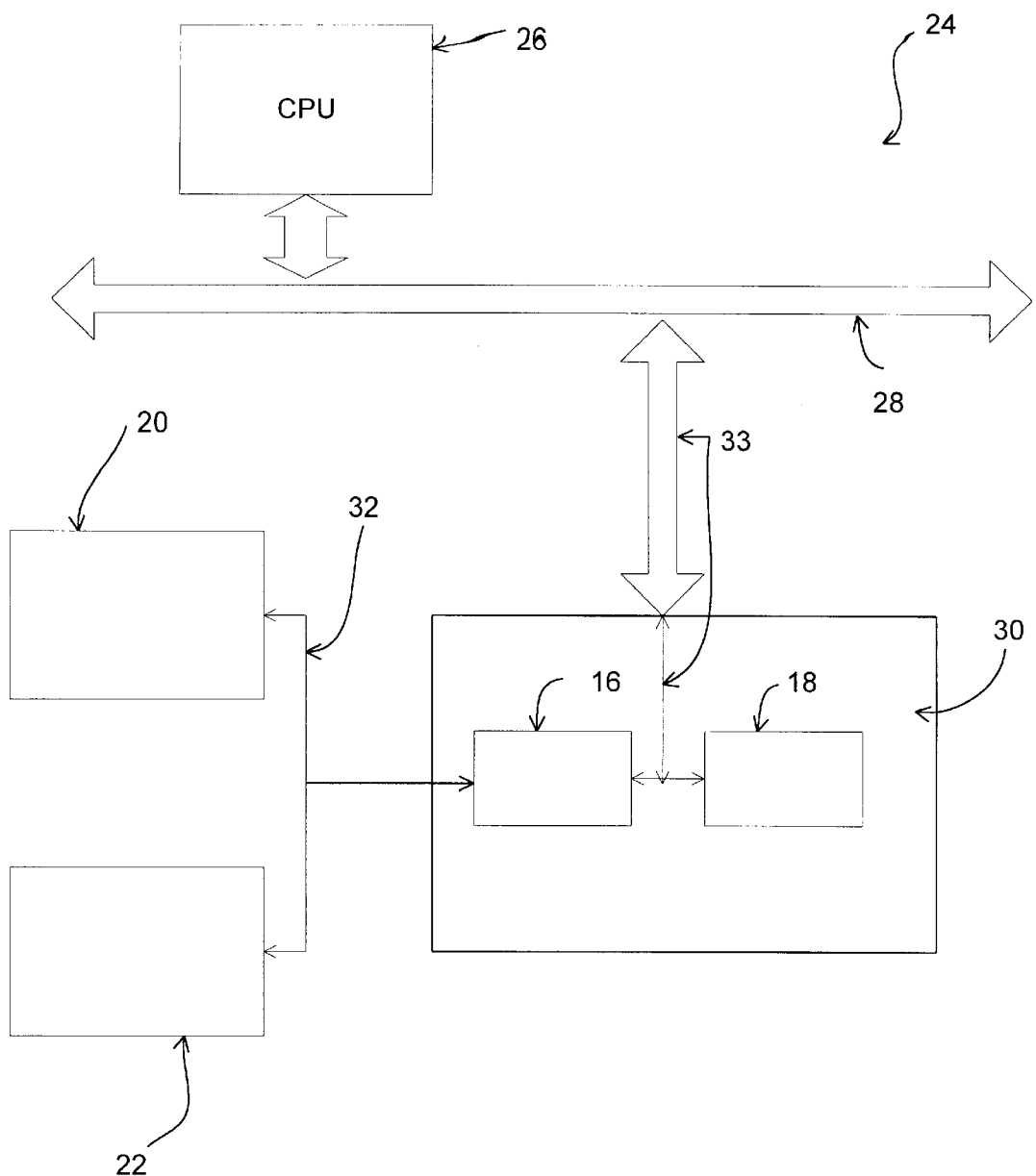
FIG. 2 is a schematic diagram showing the hardware environment of the present invention.

FIG. 2 shows the hardware environment of the invention. The graphics system 10 (FIG. 1) is implemented on a host computer 24 including a central processing unit (CPU) 26 and a bus 28. The OS driver interface 12 circuitry and software driver interface 14 run on the CPU 26. The graphics circuitry 16 and frame buffer 18, together with additional components, are implemented on one or more circuit boards 30. It will be appreciated that the circuitry 16 and buffer 18 are implemented as chips mounted on the board 30 and interfaced as pins and integrated circuit lead elements, as generally indicated by arrows 33. Displays 20 and 22 interface with the bus 28 via standard display terminals such as VGA terminals as generally indicated by arrows 32. The graphics board 30 interfaces with the circuitry 16 via a standard slot, preferably a PCI edge slot compatible with both Intel and non-Intel platforms.

The software support for the illustrated graphics system 10 is Intel PC based. Operating system platforms supported include DOS, Windows 95, Windows 3.1, Windows NT (for Intel), SCO Unix (for Intel) and OS/2. It will be appreciated that the graphics system 10 has particular advantages for use on a GUI OS such as the Windows OSs marketed by Microsoft Corp. In this regard, the OS driver interface 12 of FIG. 1 is preferably a Windows driver interface and may comprise, for example, GDI or DirectX.

The software driver interface 14 is a standard software interface driver as employed for single display systems modified with calls to set up two displays rather than one. The graphics system 10 can include further software support to perform various desktop manager functions for the multi-monitor environment such as: intercepting windows messages and relocating windows and dialog boxes as necessary to avoid monitor splits, allowing windows maximization to a full display or to the full, multi-monitor desktop, controlling the location of minimized icons, switching the window location from screen to screen, etc. The implementation of such functions is discussed in detail in co-pending U.S. patent application Ser. No. 08/733,224 entitled "Desktop Manager for Graphical User Interface Based System with Enhanced Desktop" which is incorporated by reference herein in its entirety.

As will be understood from the description below, the graphics circuitry 16 can be implemented as a single or multiple graphics chips. The circuitry generally includes all of the device driver hardware required for the displays 20 and 22 as well as any required analog-to-digital or digital-to-analog conversion components. Frame buffer 18 includes sufficient memory for the displays 20 and 22. In the illustrated embodiment, the frame buffer 18 preferably includes at least 2M of memory. The address space of this memory includes 1M that is dedicated to display 20 and 1M that is dedicated to display 22. The circuitry 16 outputs video signals to the displays 20 and 22. The illustrated displays 20 and 22 are of the same type and may be either analog (e.g., CRT monitors) or digital (e.g., LCD flat panel displays). The nature of the signals will vary accordingly.

Figure 3:
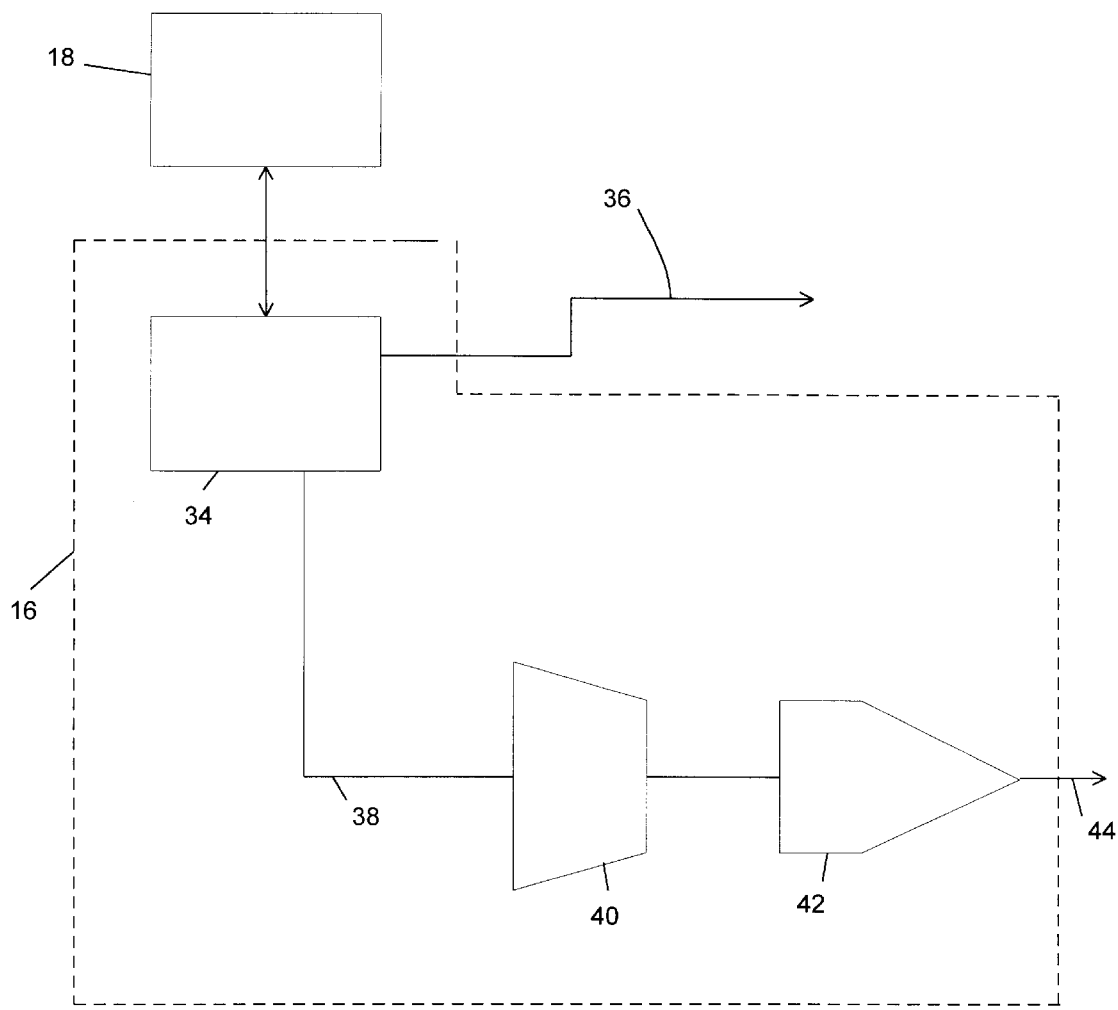
FIG. 3 is a schematic diagram showing one embodiment of the graphics device of the present invention.

FIG. 3 shows one hardware implementation of the graphics circuitry 16 and frame buffer 18 for driving two analog CRT monitors. The illustrated implementation employs a multi-display graphics chip 34 for providing a first analog output 36 and a second digital output 38. The chip 34 is preferably the model of the Aurora family manufactured by S3 Corporation. This chip 34 is marketed for presentation applications and includes the digital output 38 for driving the speaker's laptop display and the analog output for driving a CRT monitor for viewing by the audience. In the illustrated embodiment, the digital signal is processed by a digital-to-analog converter (D/A) 42 and a data reformatter 40 to provide an analog signal for driving one of the displays 20 or 22. The data reformatter 40 performs a number of functions relating to the difference in signal format between digital and analog systems. As is well known, digital displays are composed of a two-dimensional array of pixels and the corresponding video signal is a stream of digital bits transmitted in a line-by-line and frame-by-frame format. By contrast, images are formed on an analog monitor by directing a beam in a raster pattern across the screen area. The video signal for controlling operation of the beam is therefore formatted to include lines of analog video information separated by blank intervals, including no display data, corresponding to movement of the beam between lines or between frames. The data reformatter thus performs a number of functions including blank generation (e.g., by sync/clock counting) switching the polarity of the digital FPLINE and FPFRAME signals to generate HSYNC and VSYNC signals for the analog monitor clock adjustment, and reformatting the digital data 38 into a standard format for the D/A. The D/A then converts the digital data 38 into an analog signal 44 for driving an analog monitor.

Figure 4:
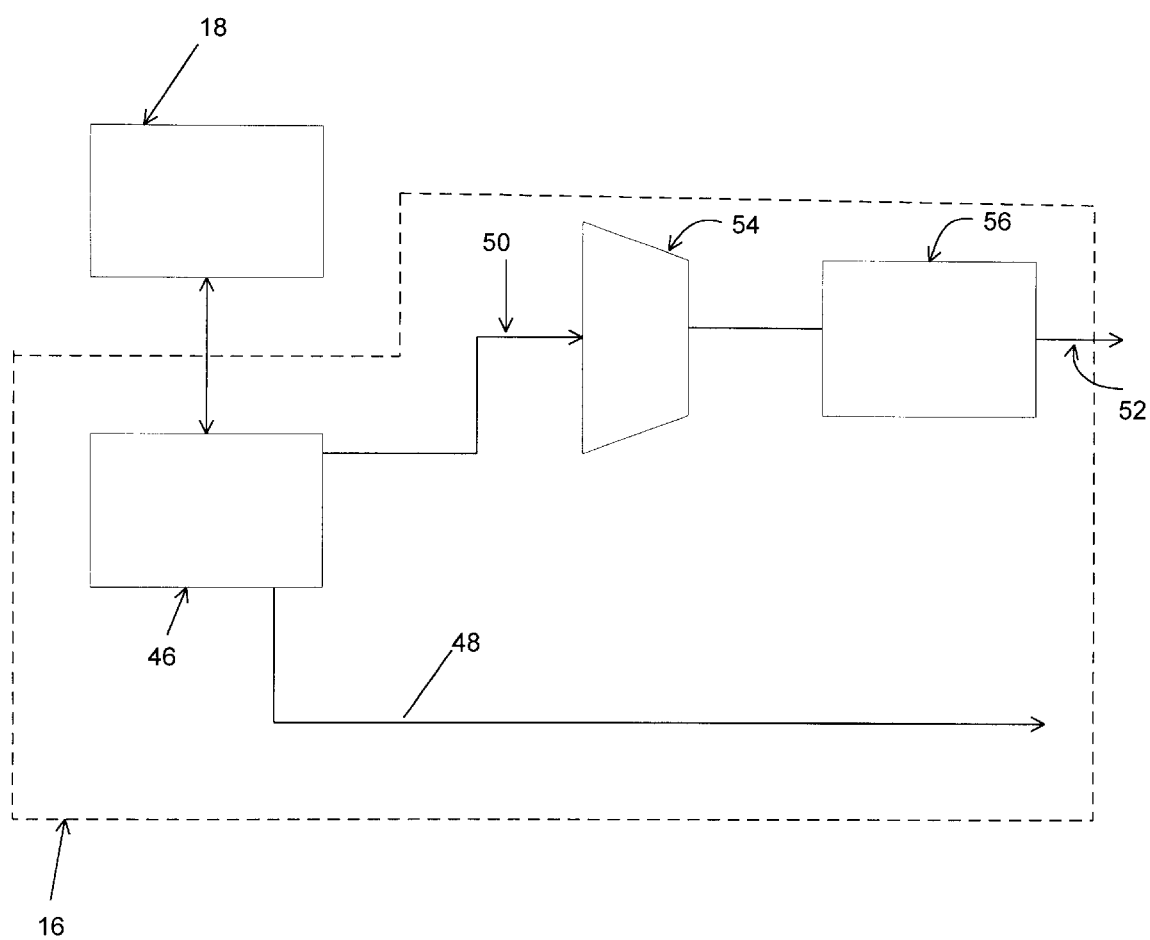
FIG. 4 is a schematic diagram showing an alternative embodiment of the graphics device of the present invention.

FIG. 4 shows an alternative embodiment of the graphics circuitry 16 and frame buffer 18 for driving two digital LCD flat panel displays. Again, the illustrated implementation employs a graphics chip 46, such as a chip of the Aurora family, for providing a digital data output 48 and an analog signal output 50. In order to provide an appropriate data output 52 for driving an LCD flat panel display, the analog signal output 50 is processed by a data reformatter 54 and an analog-to-digital (A/D) converter 56. The functions of these components are essentially the converse of the functions of elements 40 and 42 described in connection with FIG. 3. In particular, data reformatter 54 eliminates the blank intervals of the analog signal output 50 which are not required by the digital display, switches the polarity of the HSYNC and VSYNC signals to provide FPLINE and FPFRAME signals, and reformats the analog signal output 50 into a standard format for the A/D. The A/D then converts the analog signal output 50 into a digital data output 52 for driving a digital LCD flat panel display.

Figure 5:
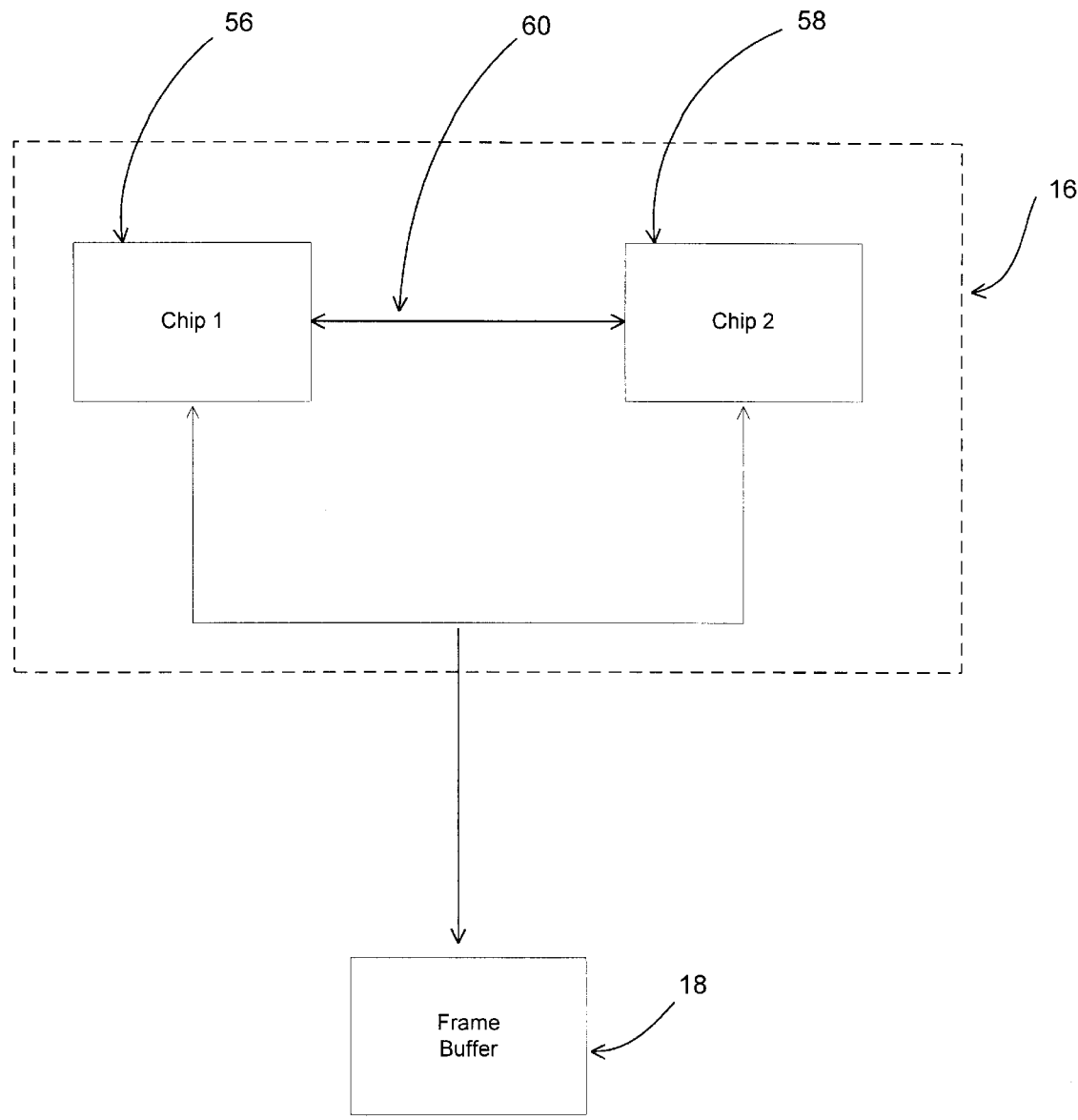
FIG. 5 is a schematic diagram showing a further alternative embodiment of the present invention.

FIG. 5 shows an alternative, two graphics chip embodiment of the graphics circuitry 16 and frame buffer 18 for driving two CRT monitors. In the illustrated embodiment, graphics circuitry 16 includes two graphics chips 56 and 58 corresponding to displays 20 and 22 (FIGS. 1 and 2) respectively. Each of the chips 56 and 58, which may comprise a standard VGA graphics chip such as marketed by Cirrus Logic, is associated with the frame buffer 18 which has sufficient memory for supporting both chips, e.g., 2M of memory. Access to the frame buffer 18 as between the chips 56 and 58 is arbitrated by appropriate logic as generally indicated by arrow 60. The illustrated embodiment thus represents a further alternative for implementing a multi-monitor system with a single frame buffer memory interface.

Figure 6:
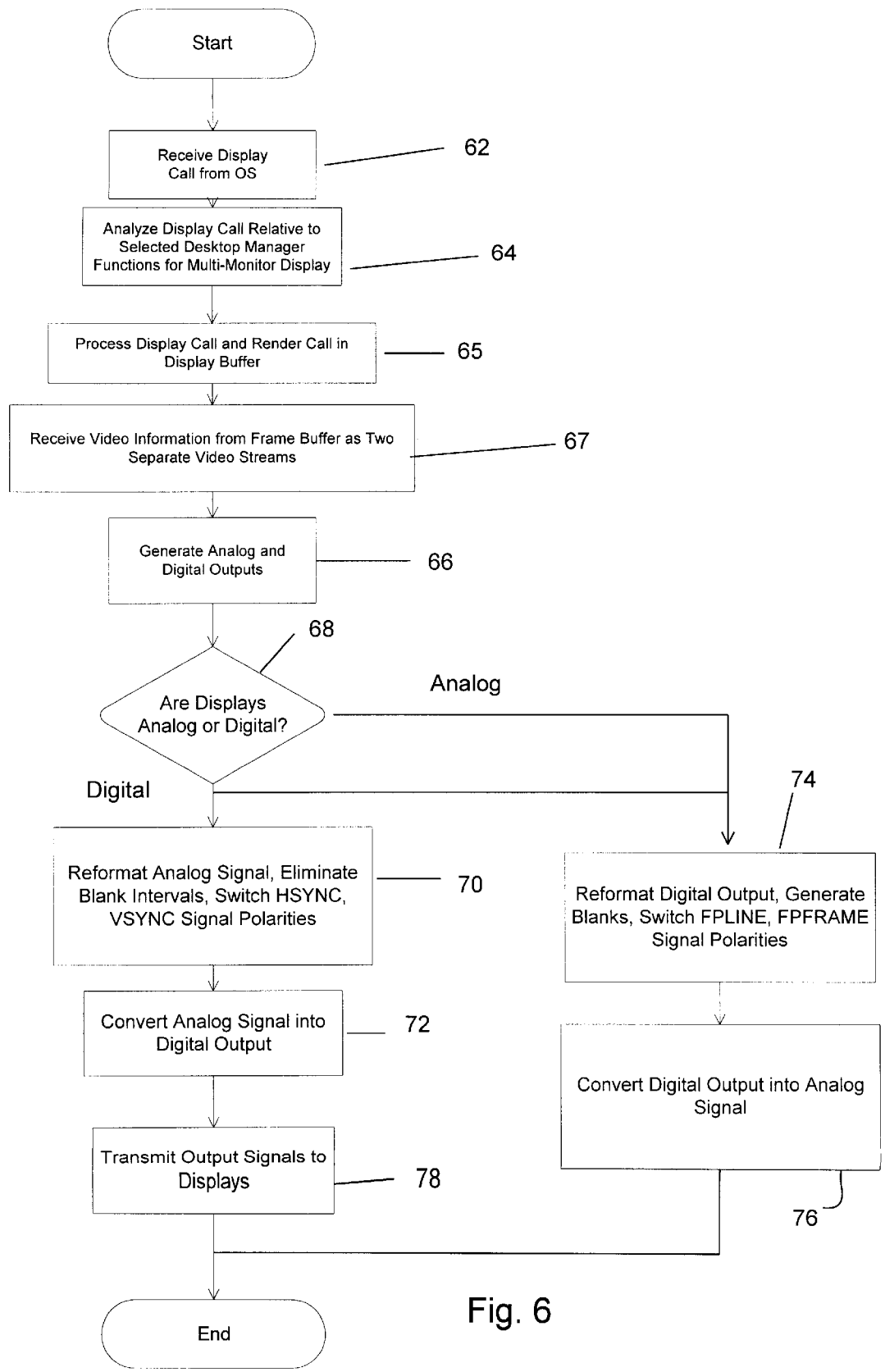
FIG. 6 is a flow chart illustrating a process of the present invention.

FIG. 6 is a flow chart illustrating operation of the single chip implementations of the present invention such as shown in FIGS. 3 and 4. The process is initiated by receiving (62) a display call from the OS, for example, providing instructions to write on the graphical desktop which is spread across the monitors 20 and 22. The call is first analyzed (64) relative to any selected program manager functions for the multi-monitor display environment and modified as necessary. For example, a call including instructions for opening a window may be modified to designate alternative window coordinates so as to avoid a monitor split. The display is processed (65) and rendered in the display buffer 18. Subsequently, video information is received (67) from the display buffer 18 as two separate video streams. The graphics circuitry 16, in the embodiments of FIGS. 3 and 4, then generates (66) analog and digital outputs. Further processing depends on whether the monitors are analog or digital (68). For digital monitors, the analog signal output is reformatted (70), the blank intervals of the analog signal output are eliminated, and the polarities of the HSYNC and VSYNC signals are switched. The analog signal is then converted (72) into a digital output. For analog monitors, the digital output is reformatted (74), blank intervals are generated, and the polarities of the FPLINE and FPFRAME signals are switched. The digital output is then converted (76) to an analog signal. Once the output signals have thus been processed to yield two signals of the same type (analog or digital), the signals are transmitted (78) to the monitors for display.

The invention thus provides a single memory interface architecture for a variety of multi-display systems. In addition, the invention supports a variety of enlarged desktop applications with reduced hardware requirements. The invention also takes advantage of existing mixed output graphics chips to reduce manufacturing costs.

While various embodiments and implementations of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A graphics device, comprising:

memory means for storing video information, said memory means including a memory interface for accessing said video information;

first graphics circuit means for accessing said video information from said memory means via said memory interface and providing first display information for use by a first monitor, said first display information being adapted for one of a digital monitor and an analog monitor;

second graphics circuit means for accessing said video information from said memory means via said memory interface and providing second display information for use by a second monitor, said second display information being adapted for the other of a digital and an analog monitor, wherein said first and second display information define heterogeneous outputs including an analog output and a digital output; and third graphics circuit means for receiving one of said first and second display information adapted for a corresponding one of a digital monitor and an analog monitor and converting said received one of said first and second display information to provide a converted output adapted for another one, opposite said corresponding one, of a digital and an analog monitor, wherein said graphics device provides homogeneous outputs of the same analog or digital type based on said heterogeneous outputs.

2. A graphics device as set forth in claim 1, wherein each of said homogeneous outputs is suitable for use by a CRT monitor.

3. A graphics device as set forth in claim 1, wherein said memory means comprises a frame buffer.

* * * * *